United States Patent [19]

Paul, Jr. et al.

[11] Patent Number: 4,811,975
[45] Date of Patent: Mar. 14, 1989

[54] FLUID COUPLING AND METHOD OF MAKING SAME

[75] Inventors: Vernon Paul, Jr., Ocala, Fla.; James D. Fox, Westchester, Ohio

[73] Assignee: Dayco Products, Inc., Dayton, Ohio

[21] Appl. No.: 533,313

[22] Filed: Sep. 19, 1983

Related U.S. Application Data

[63] Continuation of Ser. No. 346,350, Feb. 5, 1982, Pat. No. 4,431,218.

[51] Int. Cl.$^4$ .............................................. F16L 37/14
[52] U.S. Cl. ................................ 285/305; 285/332.3; 285/351; 29/451
[58] Field of Search ................ 285/321, 351, 305, 50, 285/49, 332.3, 332.2, 347, 354, DIG. 25; 29/451

[56] References Cited

U.S. PATENT DOCUMENTS

| | | | |
|---|---|---|---|
| 2,241,344 | 5/1948 | Bosworth | 285/347 X |
| 2,772,898 | 12/1956 | Seeler | 285/190 |
| 3,527,485 | 7/1968 | Goword et al. | 285/305 |
| 3,628,768 | 12/1971 | Hutt | 285/305 X |
| 3,900,221 | 8/1975 | Fouts | 285/351 X |
| 3,973,791 | 8/1976 | Porta et al. | 285/305 |
| 4,035,005 | 7/1977 | DeVincent et al. | 285/351 X |
| 4,278,276 | 7/1981 | Ekman | 285/49 |
| 4,294,473 | 10/1981 | Ekmun | 285/351 X |

FOREIGN PATENT DOCUMENTS

| | | | |
|---|---|---|---|
| 2605777 | 8/1977 | Fed. Rep. of Germany | 285/305 |
| 1496244 | 9/1966 | France | 285/305 |

OTHER PUBLICATIONS

Jan. 1975, Stecko System Catalogue.
1979 Europower U.S. Inc. Catalogue.

*Primary Examiner*—Dave W. Arola
*Attorney, Agent, or Firm*—Joseph V. Tassone

[57] ABSTRACT

A fluid coupling for a conduit which features a quick connect-disconnect construction between first and second coupling members. The first coupling member is connected to the conduit and is generally cylindrical, having a main portion and a reduced diameter portion. Peripheral grooves on the reduced portion contain sealing rings which form a fluid-tight seal with a second coupling member that fits over the first member, the sealing rings contacting an internal bore. The principal seal is provided by a resilient O-Ring which is located in the groove located at the intersection of a wall that intersects the reduced diameter portion of the first coupling member. This contacts a shoulder formed on a wall which intersects part of the bore of the second coupling member. This provides both axial and radial compression between the coupling members. The second peripheral groove is spaced from the first groove and contains another O-Ring as well as a fluoroelastomeric backup ring to enhance the seal. The two coupling members are interfitted and locked together by means of a U-shaped retaining pins that has legs inserted into opposing peripheral grooves on the main body portion of the first coupling member and the base of the second member.

11 Claims, 1 Drawing Sheet

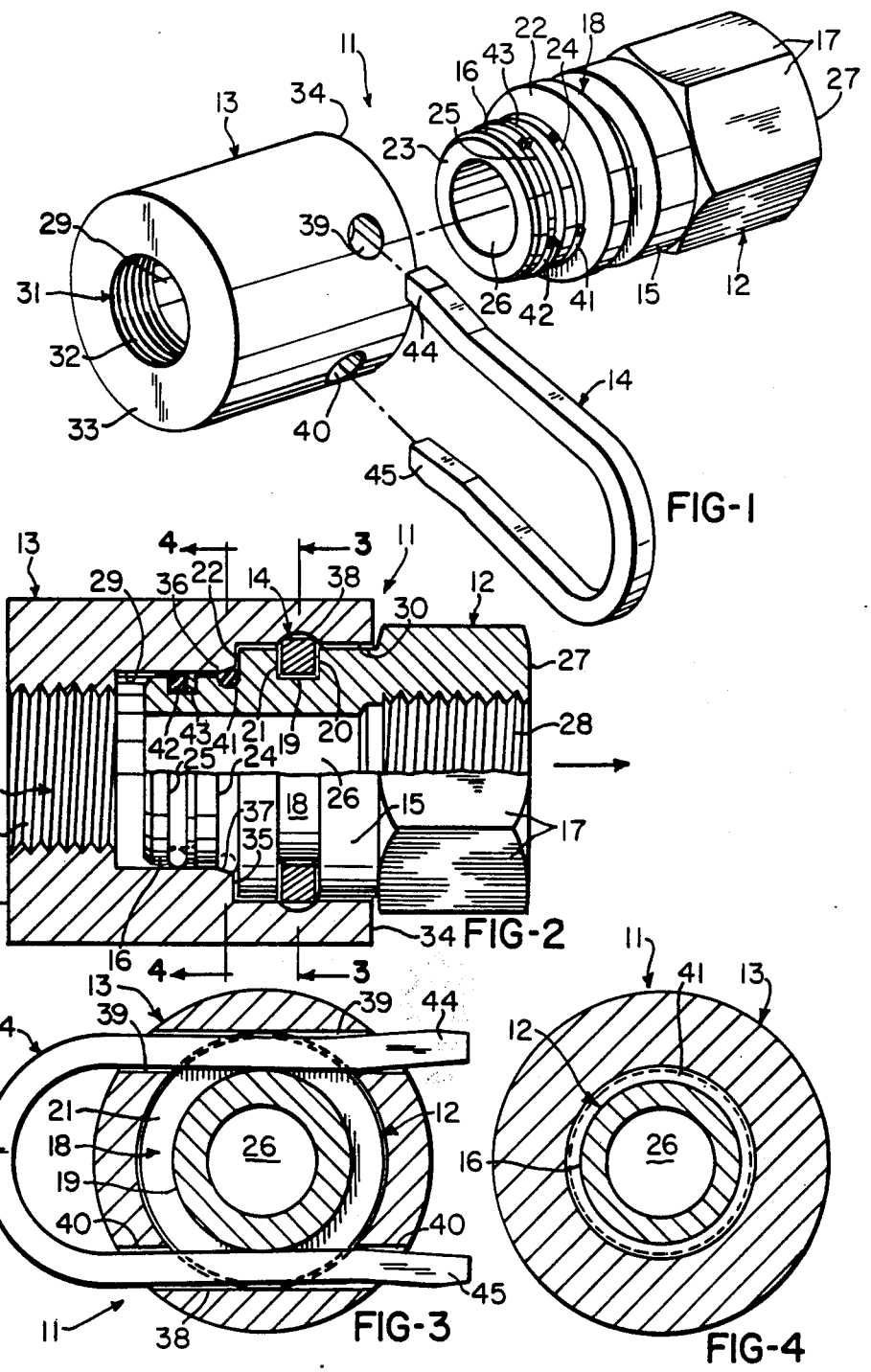

FLUID COUPLING AND METHOD OF MAKING SAME

CROSS REFERENCE TO RELATED APPLICATION

This application is a continuation patent application of its copending parent patent application, Ser. No. 346,350, filed Feb. 5, 1982, now U.S. Pat. No. 4,431,218.

BACKGROUND OF THE INVENTION

1. Field of the Invention

This invention is directed to a quick connect-disconnect coupling composed of two coupling members. One of the members is capable of being attached to a conduit for conveying fluid, and the other member to another part of the fluid conveying system.

2. Prior Art Statement

Quick connect-disconnect couplings used in the field of fluid conveying are known in the art. These are useful where rapid coupling and uncoupling of the system are required, while at the same time providing a high degree of safety during both flow and non-flow conditions. The use of various types of sealing members such as O-Rings is known for such purpose. One of the designs that has been utilized involves the use of a U-shaped retaining pin with legs that are adapted to be inserted into portions of a first and a second coupling member, thus frictionally interlocking the members. Unlocking may easily be accomplished by removing the pin. The following publications show how this concept has been utilized:

(1) U. S. Pat. No. 2,772,898 - Seeler
(2) U. S. Pat. No. 3,527,485 - Goward et al
(3) U. S. Pat. No. 3,973,791 - Porta et al
(4) Stecko System Catalog, January 1975
(5) Europower U. S. Inc. Catalog, 1979

The patent to seeler broadly shows the use of a retaining pin for interconnecting coupling members in an oxygen system, thus allowing a quick release. This is accomplished by securing a cable to the pin so that the oxygen line may be uncoupled by a pilot during ejection.

The patent to Goward et al refers to a pin design that is biased in order to lock more securely in the grooves.

The Porta patent relates to a system for deforming a portion of the assembly when the coupling members are pulled apart. This prevents an undesirable re-use of the couplings which may have burst under excessive pressures. Porta also uses a pair of spaced sealing rings.

The Stecko system features the locking pin similar to those in the patents, as well as a single groove with an O-Ring and a supporting ring.

The Europower catalog features a line of disconnect couplings having a removable pin or staple.

SUMMARY OF THE INVENTION

Although the prior art devices all utilize locking pins and grooves for use in a quick connect-disconnect coupling, they all have certain deficiencies in providing fluid-tight seals. The Stecko system attempts to seal with a double member in a single groove. Porta has two separate seals, one of the main body portion of the first coupling member, and the other on the reduced body portion. When it was ascertained that these products were not fully satisfactory, applicants developed the superior device which is embodied in the present application.

The problems which arise with such couplings are many. Primarily, high fluid pressures create pulsations, resulting in relative motion between the two coupling members. This in turn creates a shock load on the locking pin which may cause it to fatigue and fail. A second problem which arose was a low pressure leakage, or weepage, past the sealing members. This occurred because the existing constructions did not provide proper axial pressure relative to the two coupling members. At the same time, this lack of pressure often permitted dust to seep between the members.

The present invention provides a solution to the above problems. This is done by pre-loading the locking pin in order to reduce the shock load on the pin. More specifically, this is accomplished by locating one of the sealing members, or O-Rings, at a very critical location. This location creates both axial and radial compression of the two coupling members relative to each other, thus reducing or eliminating the relative motion and pulsations between the members. The best results have been found to occur when the O-Ring is mounted in a groove which is located on the reduced diameter portion of the first coupling member, exactly at the point of intersection of the wall between this portion and the main body portion. The O-Ring contacts a shoulder on the second coupling member which has a main bore and an enlarged diameter bore, the shoulder being formed by the intersection of the wall between the bores, which connects the two bores. Maximum results are obtained when the shoulder is beveled so that the larger bevel diameter is adjacent to the wall.

The reduced diameter portion not only contains the groove and ring described above, but a second groove which is spaced along the axis, and this groove has another O-Ring and backup ring similar to that of Stecko. The combination of these rings and their location provides a vastly superior result. In addition to reducing the pulsations and applying the proper compression, this arrangement eliminates the leakage of fluid and dust between the members.

It is therefore a principal object of this invention to provide a quick connect-disconnect coupling capable of applying relative axial and radial compression between coupling members.

It is a further object to provide a coupling which eliminates pulsations between the members.

It is a further object to eliminate shock loading on the pin used to couple and uncouple the members.

It is another object to eliminate leakage of fluid and dust between the members.

It is still another object to provide a method of making a coupling having the novel features described herein.

Other objects, uses and advantages of this invention are apparent from a reading of this description, which with reference to the accompanying drawings, which sets forth a complete explanation of the invention.

BRIEF DESCRIPTION OF THE DRAWINGS

FIG. 1 is an exploded perspective view of the novel coupling assembly and attached conduits.

FIG. 2 is an enlarged view of the coupling assembly in partial cross-section.

FIG. 3 is a view of the coupling assembly taken along lines 3—3 of FIG. 2, in cross-section.

FIG. 4 is a view of the coupling assembly taken along lines 4—4 of FIG. 2, in cross-section.

DESCRIPTION OF THE PREFERRED EMBODIMENT

Referring now to the drawings, the novel coupling is designated by reference numeral 11, and consists of the first coupling member 12, the second coupling member 13, and a retaining pin 14. The coupling is connected into a fluid conveying system which is not shown, since this system forms no part of the present invention.

The first coupling member 12 has a generally cylindrical configuration consisting of a main body portion 15 and a reduced diameter body portion 16, in axial alignment. A portion of the main body portion is formed with a series of flat surfaces 17 which may be gripped by a wrench or similar tool. A large peripheral groove 18 is located in the main body portion 15, this groove being rectangular in cross-section and formed by an inner surface 19 and lateral surfaces 20 and 21 which have been cut into the body portion. It should be understood that this groove shape is merely exemplary, and may if desired be circular, triangular, or any other shape. A wall 22 interconnects the main body portion 15 and reduced diameter body portion 16, which terminates at one end, designated by reference numeral 23. Two spaced peripheral grooves 24 and 25 are located in the portion 16, the groove 24 being located at the intersection of the wall 22 and the reduced diameter body portion 16, this groove being generally semi-circular in cross-section. The other groove 25 is located farther along the body portion 16 toward the end 23, and is rectangular in cross-section. A central opening 26 extends completely through the coupling member 12 from end 23 to the opposite end 27. In the exemplary construction shown, the opening is threaded with threads 28 at end 27 to receive a mating part of the conduit system.

The coupling member 13 also has a generally cylindrical body, although the external dimensions of the member are not critical and could be a parallelopiped or other convenient shape. The internal construction, as illustrated, has a principal cylindrical bore 29 having a diameter which is generally contiguous with the reduced diameter body portion 16, and an enlarged cylindrical bore 30 which is generally contiguous with the main body portion 15. The bore 29 has a reduced diameter portion 31 which has threads 32 therein. The bore is continuous from threaded end 33 to the other end 34. A wall 35 interconnects the bores 29 and 30 and is generally contiguous with the wall 22 of the coupling member 12. A shoulder 36 is formed by the intersection of wall 35 and bore 29, and has a bevel 37 as shown so that its greater diameter is adjacent the walls. A semi-circular groove 38 is located in the engaged bore 30, and is located opposite and contiguous to the groove 18 of coupling member 12. Openings 39 and 40 extend through the body of the member 13, and are radially aligned with the grooves 18 and 38 during assembly.

The sealing members utilized in the invention include the principal member 41, which is preferably an O-Ring which is soft and compressible, and made of an elastomeric material such as rubber. The O-Ring usually has a Shore A durometer hardness in the 30 to 50 range. This O-Ring is inserted into the groove 24. When the coupling members are assembled as shown in FIGS. 2 and 4, the O-Ring contacts and is partially compressed against the shoulder 36, with the bevel 37 ensuring that the O-Ring will make proper contact between the two coupling members. Inserted in the other peripheral groove 25 is another O-Ring 42 and a "backup" ring 43, which provide a secondary seal. The O-Ring 42 is similar to O-Ring 41, but is generally a harder elastomer, about 70-90 shore A. The member 43 is formed of a material having special properties, such as a fluoroelastomer, nylon or other polymeric materials. Upon assembly of the coupling members, the rings 42 and 43 both contact and compress against the bore 29 to provide the required seal.

Upon assembly of the coupling, the member 12 is inserted into member 13 so that the body portion 15 and 16 are contiguous with the bores 30 and 31. This places sealing members 41, 42 and 43 within the bore 29. The retaining pin 14 is inserted into the assembly by passing legs 44 and 45 through the openings 39 and 40 and into the grooves 18 and 38, thus locking the members together. The legs 44 and 45 are sufficiently resilient to easily slip into place and create a tight frictional contact with the sides of the grooves. Although the legs are shown as having a square cross-section, it is understood that the shape may be circular, or any other convenient shape. The fluid flows through the system, including the bore 29 and opening 26 in the direction shown by the arrow in FIG. 2. Any potential leakage is prevented by the sealing members, the O-Ring 41 exerting the greatest control. This is because of its location on the reduced diameter body portion along with the other rings, and particularly because its contact at the shoulder 36 creates a unique compression that is both axial and radial in nature. This eliminates the undesirable pulsations between the coupling members which can occur with other designs. It also eliminates the low pressure fluid leakage and dust leakage which occurs with other designs.

It also can be seen that this invention provides a novel method for making the improved coupling.

While the embodiment shown herein is only exemplary, it should be understood that other forms of the invention fall within the scope of this description and the claims which are appended hereto.

We claim:

1. In a first coupling member for a quick connect-disconnect coupling for a conduit that comprises said first coupling member and a second coupling member and retaining means for interlocking said members, said first coupling member having a generally cylindrical configuration comprising a main body portion, a reduced diameter body portion having a peripheral surface, and a first wall extending radially of an intersecting said portions, said main body portion having a peripheral groove therein, said second coupling member being adapted to be positioned over said first coupling member and have a principal cylindrical bore generally contiguous with said reduced diameter body portion, an enlarged diameter bore generally contiguous with said main body portion, and a second wall contiguous with said first wall and extending radially of and intersecting said bores, the intersection of said second wall and said principal bore forming a beveled shoulder, said enlarged diameter bore having a peripheral groove opposite the peripheral groove in said first coupling member, said retaining means comprising a U-shaped member having legs with said legs being adapted to be inserted into the peripheral grooves of said first and second coupling members to interlock said members, said reduced diameter body portion of said first coupling member having a plurality of spaced peripheral grooves therein, and resilient sealing members positioned within said spaced grooves and being adapted to contact said second coupling member to create a fluid-tight seal, the improvement wherein one of said spaced peripheral grooves is located at the intersection of said first wall and said reduced diameter body portion and interrupts said peripheral surface immediately adjacent said first wall whereby said beveled shoulder is adapted to be located radially contiguous to said one peripheral groove and is adapted to engage and compress said sealing member in said one groove in such a manner that said sealing member in said one groove is adapted to be placed under compression and is adapted to apply axial and radial compressive forces between said first and second coupling members.

2. The first coupling member of claim 1 in which said first wall is disposed substantially at a right angle to said peripheral surface of said reduced diameter portion of said first coupling member.

3. The first coupling member of claim 1 in which said one peripheral groove has a generally semi-circular cross section.

4. The first coupling member of claim 1 in which said sealing member in said one groove is an elastomeric O-ring having a Shore A durometer hardness in the range of 30 to 50.

5. The first coupling member of claim 1 including a plurality of sealing members positioned within the other of said spaced peripheral grooves.

6. The first coupling member of claim 5 in which said plurality of sealing members comprises an elastomeric O-ring.

7. The first coupling member of claim 1 in which said plurality of sealing members comprises a polymeric sealing ring.

8. In a method of making a first coupling member for a quick connect-disconnect coupling which method comprises the steps of forming said first coupling member with a generally cylindrical configuration having a main body portion, a reduced diameter body portion having a peripheral surface, and a first wall extending radially of and intersecting said portions so that a second coupling member having a principal cylindrical bore, an enlarged diameter bore, and a second wall extending radially of and intersecting said bores and forming a beveled shoulder at its intersection with said principal bore can be positioned over said first coupling member and be interlocked thereto by a U-shaped retaining means having legs adapted to be inserted into opposite peripheral grooves formed in said main body portion and said enlarged diameter bore so that said principal cylindrical bore is generally contiguous with said reduced diameter body portion, said enlarged diameter bore is generally contiguous with said main body portion, and said first and second walls are contiguous with each other, forming a plurality of spaced peripheral grooves on said reduced diameter body portion of said first coupling member, and positioning resilient sealing members within said spaced peripheral grooves which are adapted to contact said second coupling member to thereby create a fluid-tight seal, the improvement comprising the steps of forming one of said spaced peripheral grooves at the intersection of said first wall and said reduced diameter portion in a manner to interrupt said peripheral surface immediately adjacent said first wall whereby said beveled shoulder of said second coupling member is adapted to be radially contiguous to said one groove and is adapted to engage and compress said sealing member in said one groove in such a manner that said sealing member in said one groove is adapted to be placed under compression and is adapted to apply axial and radial compressive forces between said first and second coupling members.

9. The method of claim 8 including the step of forming said first wall to be substantially at a right angle to said peripheral surface of said reduced diameter portion of said first coupling member.

10. The method of claim 8 including the step of forming said one groove to be substantially semi-circular in cross section.

11. The method of claim 8 including the step of positioning a plurality of sealing members within the other of said spaced peripheral grooves.

* * * * *